US011601078B2

(12) United States Patent
Lin et al.

(10) Patent No.: US 11,601,078 B2
(45) Date of Patent: Mar. 7, 2023

(54) BRUSHLESS DC ELECTRIC (BLDC) MOTOR DRIVER CIRCUIT AND START-UP CONTROL METHOD THEREOF

(71) Applicant: Richtek Technology Corporation, Zhubei (TW)

(72) Inventors: I-Chi Lin, New Taipei (TW); Chang-Yi Lin, Hsinchu (TW); Ming-Cheng Chen, Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 21 days.

(21) Appl. No.: 17/488,119

(22) Filed: Sep. 28, 2021

(65) Prior Publication Data

US 2022/0149763 A1     May 12, 2022

(30) Foreign Application Priority Data

Nov. 10, 2020    (TW) .................................. 109139206

(51) Int. Cl.
| H02P 6/14 | (2016.01) |
| H02P 6/182 | (2016.01) |
| H02M 7/5387 | (2007.01) |
| H02P 6/20 | (2016.01) |
| H02M 1/088 | (2006.01) |

(52) U.S. Cl.
CPC .......... *H02P 6/182* (2013.01); *H02M 7/5387* (2013.01); *H02P 6/20* (2013.01); *H02M 1/088* (2013.01)

(58) Field of Classification Search
CPC .......... H02P 6/182; H02P 6/20; H02M 7/5387
See application file for complete search history.

(56) References Cited

FOREIGN PATENT DOCUMENTS

WO    WO-2021105425 A2 *  6/2021  .......... A61M 60/178

\* cited by examiner

*Primary Examiner* — Karen Masih
(74) *Attorney, Agent, or Firm* — Tung && Associates

(57) ABSTRACT

A BLDC motor driver circuit includes: a driving power stage circuit configured to provide a start-up test signal in a start-up mode to excite a BLDC motor, to drive a rotor of the BLDC motor to rotate for a test; a current unidirectional circuit coupled to the BLDC motor at a reverse end for detecting a BEMF, to generate a detection signal at a forward end of the current unidirectional circuit, wherein when a voltage at the reverse end exceeds a voltage at the forward end, the current unidirectional circuit limits the voltage at the forward end not to be higher than a clamp voltage; a biasing circuit for biasing the current unidirectional circuit in a forward operation state and for providing the clamp voltage; and a sensor circuit for generating a sensing signal according to the detection signal to indicate a test rotation state of the BLDC motor.

9 Claims, 4 Drawing Sheets

BRUSHLESS DC ELECTRIC (BLDC) MOTOR DRIVER CIRCUIT AND START-UP CONTROL METHOD THEREOF

CROSS REFERENCE

The present invention claims priority to TW 109139206 filed on Nov. 10, 2020.

BACKGROUND OF THE INVENTION

Field of Invention

The present invention relates to a brushless DC electric (BLDC) motor driver circuit; particularly, it relates to such BLDC motor driver circuit capable of detecting a small back electromotive force (BEMF).

Description of Related Art

Conventionally, when a brushless DC electric (BLDC) motor driver circuit starts up, typically, a back electromotive force (BEMF) of each phase of the BLDC motor is retrieved by voltage division resistors, thus determining a position of a rotor of the BLDC motor, so as to precisely control the driving current of the corresponding phase when the BLDC motor enters normal operation. The levels of the retrieved signals during the start up period is proportional to the BEMF by a ratio of the voltage division. If the BEMF is too small, the retrieved signals will be too small to be correctly read by IC. On the other hand, if the BEMF is large, although it is easier to be read, however it requires the rotor of the BLDC motor to have a considerably obvious disturbance, but this is not acceptable.

In view of the above, to overcome the drawbacks in the prior art, the present invention proposes a novel brushless dc electric (BLDC) motor driver circuit and a start-up control method thereof.

SUMMARY OF THE INVENTION

From one perspective, the present invention provides a brushless DC electric (BLDC) motor driver circuit, which is configured to operably drive a BLDC motor; the BLDC motor driver circuit comprising: a driving power stage circuit, which is configured to operably provide a start-up test signal in a start-up mode to excite the BLDC motor, so as to drive a rotor of the BLDC motor to rotate for a test; a current unidirectional circuit having a reverse end coupled to the BLDC motor, wherein the current unidirectional circuit is configured to operably detect a BEMF generated during a period wherein the BLDC motor rotates for the test in the start-up mode, so as to generate a detection signal at a forward end of the current unidirectional circuit, and wherein when a voltage at the reverse end is higher than a voltage at the forward end, the current unidirectional circuit is configured to operably limit the voltage at the forward end not to be higher than a clamp voltage; a biasing circuit coupled to the forward end of the current unidirectional circuit, wherein the biasing circuit is configured to operably bias the current unidirectional circuit in a forward operation state and is configured to operably provide the clamp voltage; and a sensor circuit coupled to the forward end, wherein the sensor circuit is configured to operably generate a sensing signal according to the detection signal, wherein the sensing signal is indicative of a test rotation state of the BLDC motor.

In one embodiment, the BLDC motor includes a plurality of coils, and wherein in a normal mode subsequent to an end of the start-up mode, the driving power stage circuit is configured to operably supply a plurality of operation currents to the plurality of coils according to the sensing signal, thus controlling the rotor to rotate.

In one embodiment, the sensor circuit is configured to operably generate a plurality of sensing signals according to a plurality of detection signals, and the current unidirectional circuit includes a plurality of unidirectional control devices, wherein in the start-up mode, each unidirectional control device is configured to operably sense a corresponding BEMF, so as to generate a corresponding one of the detection signals; wherein the plurality of sensing signals indicate a relationship of time point versus position of the rotor of the BLDC motor.

In one embodiment, the current unidirectional circuit includes at least one unidirectional control device, wherein the at least one unidirectional control device includes one of the following: (1) a diode having a forward end coupled to the forward end of the current unidirectional circuit and having a reverse end coupled to the reverse end of the current unidirectional circuit; (2) a first Metal-Oxide-Semiconductor Field-Effect Transistor (MOSFET) device, which is configured as a MOSFET diode in a diode-connected manner, the MOSFET diode having a forward end coupled to the forward end of the current unidirectional circuit and having a reverse end coupled to the reverse end of the current unidirectional circuit; or (3) a second MOSFET device having a first end coupled to the forward end of the current unidirectional circuit and having a second end coupled to the reverse end of the current unidirectional circuit, wherein when the voltage at the reverse end of the current unidirectional circuit is higher the voltage at the forward end of the current unidirectional circuit, the second MOSFET device is OFF, and wherein when the voltage at the reverse end of the current unidirectional circuit is not higher than the voltage at the forward end of the current unidirectional circuit, the second MOSFET device is ON.

In one embodiment, the driving power stage circuit includes a plurality of groups of half-bridge power devices, which are configured to operably generate the plurality of operation currents.

In one embodiment, before the start-up mode begins, the sensor circuit is configured to operably control a plurality of lower gate devices in the plurality of groups of half-bridge power devices, so as to electrically connect one end of the plurality of coils to a ground voltage level, thereby calibrating forward conduction voltages of the plurality of unidirectional control devices.

From another perspective, the present invention provides an start-up control method for controlling a brushless DC electric (BLDC) motor driver circuit, wherein the BLDC motor driver circuit is configured to operably drive a BLDC motor; the start-up control method comprising: providing a start-up test signal in a start-up mode to excite the BLDC motor, so as to drive a rotor of the BLDC motor to rotate for a test; in the start-up mode, detecting a back electromotive force (BEMF) generated during a period wherein the BLDC motor rotates for the test, so as to generate a detection signal wherein the step of detecting the BEMF is by current unidirectional flow; limiting the detection signal not to be higher than a clamp voltage; and generating a sensing signal according to the detection signal, wherein the sensing signal is indicative of a test rotation state of the BLDC motor.

In one embodiment, the BLDC motor includes a plurality of coils, wherein in a normal mode subsequent to an end of the start-up mode, a driving power stage circuit is configured to operably supply a plurality of operation currents to the plurality of coils, thus controlling the rotor to rotate.

In one embodiment, the start-up control method further comprises: in the start-up mode, detecting a plurality of BEMFs of the plurality of coils, so as to generate a plurality of detection signals, wherein the step of detecting the plurality of BEMFs is by current unidirectional flow; and generating a plurality of sensing signals according to the plurality of detection signals, wherein the plurality of sensing signals indicate a relationship of time point versus position of the rotor of the BLDC motor.

Advantages of the present invention include: that the present invention can retrieve a back electromotive force (BEMF) by a predetermined ratio via a current unidirectional circuit, and bias it at a positive level, so that a controller can read it correctly; and that the present invention can resist a high voltage, to protect the controller from being damaged.

Another advantage of the present invention includes: that the present invention can clamp a high voltage via a biasing circuit, so as to prevent the controller from being damaged.

Still another advantage of the present invention includes: that the present invention can detect a very small BEMF, so that only a small disturbance of the rotor of the BLDC motor is required.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
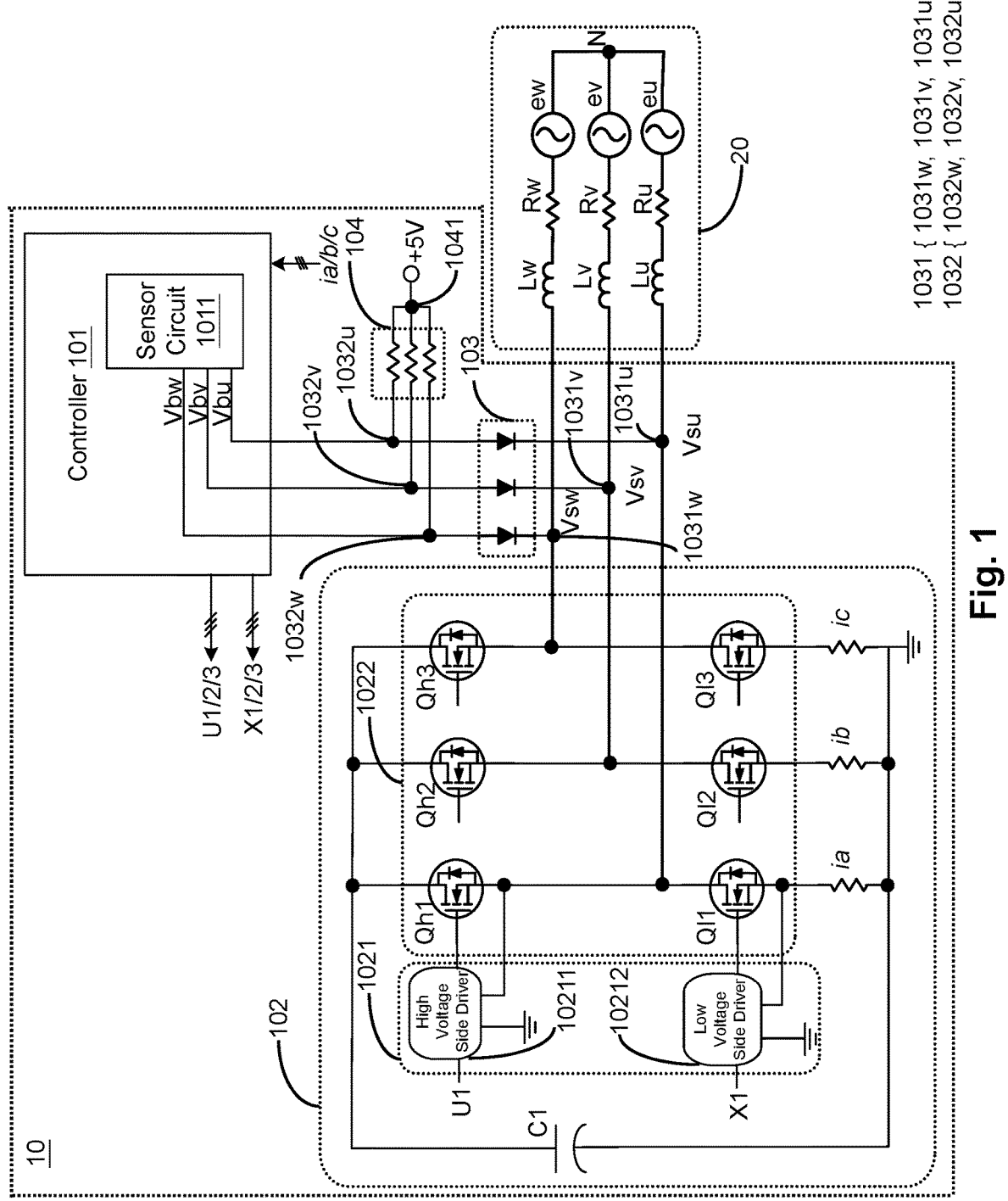
FIG. 1 shows a schematic diagram of a brushless DC electric (BLDC) motor driver circuit according to an embodiment of the present invention.

Please refer to FIG. 1, which shows a schematic diagram of a brushless DC electric (BLDC) motor driver circuit according to an embodiment of the present invention. As shown in FIG. 1, in one embodiment, the BLDC motor driver circuit 10 is configured to operably drive a BLDC motor 20. The BLDC motor driver circuit 10 comprises: a controller 101, a driving power stage circuit 102, a current unidirectional circuit 103 and a biasing circuit 104. The BLDC motor 20 has plural coils. In the embodiment of FIG. 1, the BLDC motor 20 is implemented as a three-phase BLDC motor; under such implementation, the BLDC motor 20 includes a U-phase coil, a V-phase coil, a W-phase coil. It should be understood that the implementation of the BLDC motor 20 as a three-phase BLDC motor in the above-mentioned embodiment shown in FIG. 1 is only an illustrative example, but not for limiting the broadest scope of the present invention. In other embodiments, it is also practicable and within the scope of the present invention that the BLDC motor 20 can be implemented as a 2-phase BLDC motor, a 5-phase BLDC motor or any other plural phase BLDC motor. The controller 101 comprises a sensor circuit 1011. In one embodiment, the sensor circuit 1011 can be an analog circuit, which can process an analog signal straightforwardly. In another embodiment, the sensor circuit 1011 can include an analog-to-digital conversion (ADC) circuit which converts an analog signal to a digital signal, and the sensor circuit 1011 can process the digital signal converted by the ADC. The driving power stage circuit 102 is configured to operably provide a start-up test signal to at least one coil of the BLDC motor 20 in a start-up mode, to excite the BLDC motor 20, so as to drive a rotor of the BLDC motor 20 to rotate for a test. After the rotor of the BLDC motor 20 performs such test rotation, the driving power stage circuit 102 ceases providing the start-up test signal, and the current unidirectional circuit 103 detects a back electromotive force (BEMF) generated by the BLDC motor 20 during the test rotation, to obtain information related to the corresponding coil of the BLDC motor 20.

In one embodiment, the driving power stage circuit 102 is configured to operably provide a start-up test signal to at least one coil of the BLDC motor 20 in the start-up mode, to excite the BLDC motor 20, so as to drive a rotor of the BLDC motor 20 to rotate for a test. After the rotor of the BLDC motor 20 performs such test rotation, the driving power stage circuit 102 ceases providing the start-up test signal, and the current unidirectional circuit 103 detects the BEMF of every phase generated during the test rotation, so as to determine the relationship of time point versus position of the rotor of the BLDC motor 20. The thus obtained relationship of relationship of time point versus position of the rotor of the BLDC motor 20 is provided to the driving power stage circuit 102, whereby in a normal mode subsequent to an end of the start-up mode, the driving power stage circuit 102 supplies operation currents according to the relationship of time point versus position of the rotor of the BLDC motor 20 to the U-phase coil, V-phase coil and W-phase coil of the BLDC motor 20, to control the rotor to rotate.

In one embodiment, the current unidirectional circuit 103 has a reverse end 1031 (a collective term, in this embodiment 1031 includes 1031w, 1031v and 1031u) coupled to the BLDC motor 20, to detect BEMFs ew, ev and eu generated during the test rotation of the BLDC motor 20 in the start-up mode, so as to generate detection signals Vbw, Vbv and Vbu at a forward end 1032 (a collective term, in this embodiment 1032 includes 1032w, 1032v and 1032u) of the current unidirectional circuit 103. In a case where a voltage at the reverse end 1031 exceeds a voltage at the forward end 1032, the current unidirectional circuit 103 limits the voltage at the forward end 1032 not to be higher than a clamp voltage, such as +5V, thus protecting the controller 101. As a consequence, it is not required for the electronic devices in the controller 101 to be devices capable of withstanding high voltage. That the current unidirectional circuit 103 limits the voltage at the forward end 1032 not to be higher than a clamp voltage prevents the controller 101 from receiving a voltage higher than a predetermined voltage; thus, in one embodiment, the clamp voltage can be set according to the voltage upper limit that the controller 101 can withstand, that is, the clamp voltage can be set to a value lower than the voltage upper limit that the controller 101 can withstand.

The reverse end 1031 of the current unidirectional circuit 103 includes, for example, reverse ends 1031w, 1031v and 1031u shown in FIG. 1. The forward end 1032 of the current unidirectional circuit 103 includes, for example, forward ends 1032w, 1032v and 1032u shown in FIG. 1. The current unidirectional circuit 103s only allows a current to flow from the forward end 1032 to the reverse end 1031, but not from the reverse end 1031 to the forward end 1032. From one perspective, when the voltage at the reverse end 1031 of the current unidirectional circuit 103 is higher than the voltage at the forward end 1032 of the current unidirectional circuit 103, the path between the reverse end 1031 and the forward end 1032 is OFF; when the voltage at the reverse end 1031 of the current unidirectional circuit 103 is not higher than the voltage at the forward end 1032 of the current unidirectional circuit 103, the path between the reverse end 1031 and the forward end 1032 is ON.

The current unidirectional circuit 103 has at least one unidirectional control device. In the start-up mode, each unidirectional control device is configured to operably sense a corresponding BEMF ew, ev and eu, so as to generate a corresponding detection signal Vbw, Vbv and Vbu. As shown in FIG. 1, in one embodiment, each of the unidirectional control devices can be a diode having a forward end coupled to the forward end 1032 of the current unidirectional circuit 103 and having a reverse end coupled to the reverse end 1031 of the current unidirectional circuit 103. In one embodiment, the above-mentioned diode can include, for example but not limited to, a PN diode, a Schottky diode or a Zener diode.

Figure 4A:
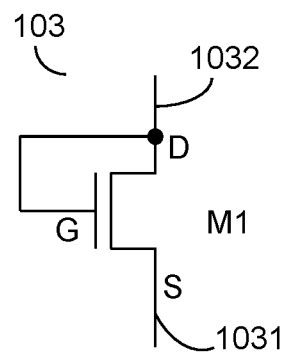
FIGS. 4A-4C shows several embodiments of unidirectional control devices in a current unidirectional circuit of a BLDC motor driver circuit, respectively.
Figure 4B:
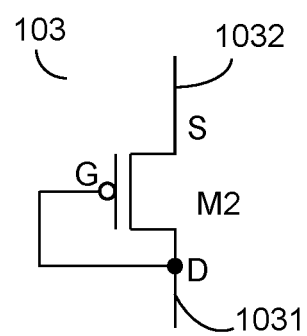
Figure 4C:
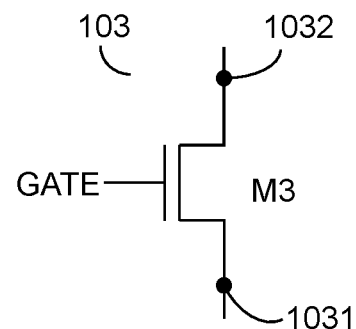

Please refer to FIGS. 4A-4C, which show several embodiments of the unidirectional control devices in a current unidirectional circuit of a BLDC motor driver circuit, respectively. As shown in FIG. 4A and FIG. 4B, in another embodiment, the unidirectional control device can be a Metal-Oxide-Semiconductor Field-Effect Transistor (MOSFET) device (e.g., M1 or M2), which is configured as a MOSFET diode in a diode-connected manner. The above-mentioned MOSFET diode has a forward end coupled to the forward end 1032 of the current unidirectional circuit 103 and has a reverse end coupled to the reverse end 1031 of the current unidirectional circuit 103. In the embodiment shown in FIG. 4A, the NMOSFET device M1 has a gate and a drain coupled to the forward end of NMOSFET diode, and a source coupled to the reverse end of NMOSFET diode. In the embodiment shown in FIG. 4B, the PMOSFET device M2 has a gate and a drain coupled to the reverse end of PMOSFET diode, and a source coupled to the forward end of PMOSFET diode.

As shown in FIG. 4C, in still another embodiment, the unidirectional control device can be a MOSFET device (e.g., M3) having a first end coupled to the forward end 1032 of the current unidirectional circuit 103 and has a second end coupled to the reverse end 1031 of the current unidirectional circuit 103. When the voltage at the reverse end 1031 of the current unidirectional circuit 103 exceeds the voltage at the forward end 1032 of the current unidirectional circuit 103, the MOSFET device M3 is turned OFF by controlling a control end GATE of the MOSFET device M3. When the voltage at the reverse end 1031 of the current unidirectional circuit 103 does not exceed the voltage at the forward end 1032 of the current unidirectional circuit 103, the second MOSFET device M3 is turned ON by controlling a control end GATE of the second MOSFET device M3.

Please still refer to FIG. 1. In one embodiment, the biasing circuit 104 is coupled to the forward end 1032 of the current unidirectional circuit 103. The biasing circuit 104 is configured to operably bias the current unidirectional circuit 103 so that the current unidirectional circuit 103 operates in a forward operation state, and the biasing circuit 104 is configured to operably provide the above-mentioned clamp voltage. In one embodiment, another end of the biasing circuit 104 is coupled to the clamp voltage (which is for example but not limited to, +5V). The sensor circuit 1011 is coupled to the forward end 1032. The sensor circuit 1011 is configured to operably generate a sensing signal according to the detection signals Vbw, Vbv and Vbu, wherein the sensing signal is indicative of a test rotation state of the BLDC motor 20. The voltage at the reverse end 1031 of each unidirectional control device is the voltage Vsw, the voltage Vsv and the voltage Vsu. In one embodiment, the sensor circuit 1011 is configured to operably generate sensing signals according to the detection signals Vbw, Vbv and Vbu, wherein the sensing signals are indicative of a relationship of time point versus position of the rotor of the BLDC motor 20, so that the above-mentioned test rotation state of the BLDC motor 20 can be obtained. In a normal mode subsequent to an end of the start-up mode, the driving power stage circuit 102 supplies operation currents to the coils according to the sensing signals, thus controlling the rotor to rotate.

The driving power stage circuit 102 comprises a driver 1021 and a power stage circuit 1022. The driver 1021 includes a high voltage side driver 10211 and a low voltage side driver 10212. The power stage circuit 1022 includes plural half-bridge power devices, which are configured to operably generate the operation currents. The half-bridge power devices for example include upper gate power devices Qh1, Qh2 and Qh3 and lower gate power devices Q11, Q12 and Q13. The upper gate power device Qh1 is connected in series to the lower gate power device Q11 and a resistor ia. The upper gate power device Qh2 is connected in series to the lower gate power device Q12 and a resistor ib. The upper gate power device Qh3 is connected in series to the lower gate power device Q13 and a resistor ic. The resistor ia, the resistor ib and the resistor ic are commonly coupled to the ground voltage level. The upper gate power device Qh1, the upper gate power device Qh2 and the upper gate power device Qh3 are commonly coupled to a capacitor C1. The high voltage side driver 10211 is coupled to the upper gate power device Qh1, whereas, the low voltage side driver 10212 is coupled to the lower gate power device Q11. A node between the upper gate power device Qh1 and the lower gate power device Q11, a node between the upper gate power device Qh2 and the lower gate power device Q12 and a node between the upper gate power device Qh3 and the lower gate power device Q13 are coupled to a phase inductor Lw, a phase inductor Lv and a phase inductor Lu of the BLDC motor 20, respectively.

The BLDC motor 20 includes: a phase inductor Lw and a phase resistor Rw which are of W phase, a phase inductor Lv and a phase resistor Rv which are of V phase, a phase inductor Lu and a phase resistor Ru which are of U phase. The phase inductor Lw is connected in series to the phase resistor Rw. The phase inductor Lv is connected in series to the phase resistor Rv. The phase inductor Lu is connected in series to the phase resistor Ru. The phase resistor Rw, the phase resistor Rv and the phase resistor Ru are commonly coupled to a neutral node N. Before the start-up mode begins, the sensor circuit 1011 controls the lower gate devices Q11, Q12 and Q13 to electrically connect one end of the coils to a ground voltage level, thereby calibrating the forward conduction voltages of the unidirectional control devices, and record calibrated forward conduction voltages of the unidirectional control devices in the sensor circuit 1011. In one embodiment, the sensor circuit 1011 controls the lower gate devices Q11, Q12 and Q13 in a sequential order, to sequentially electrically connect one end of the coils to the ground voltage level, thereby sequentially calibrating the forward conduction voltages of the unidirectional control devices. In another embodiment, the sensor circuit 1011 controls the lower gate devices Q11, Q12 and Q13 simultaneously, to simultaneously electrically connect one end of the coils to the ground voltage level, thereby simultaneously calibrating the forward conduction voltages of the unidirectional control devices. In yet another embodiment, the sensor circuit 1011 controls the lower gate devices Q11, Q12 and Q13 in a random order, to electrically connect one end of the coils to the ground voltage level, thereby calibrating the forward conduction voltages of the unidirectional control devices.

Figure 2:
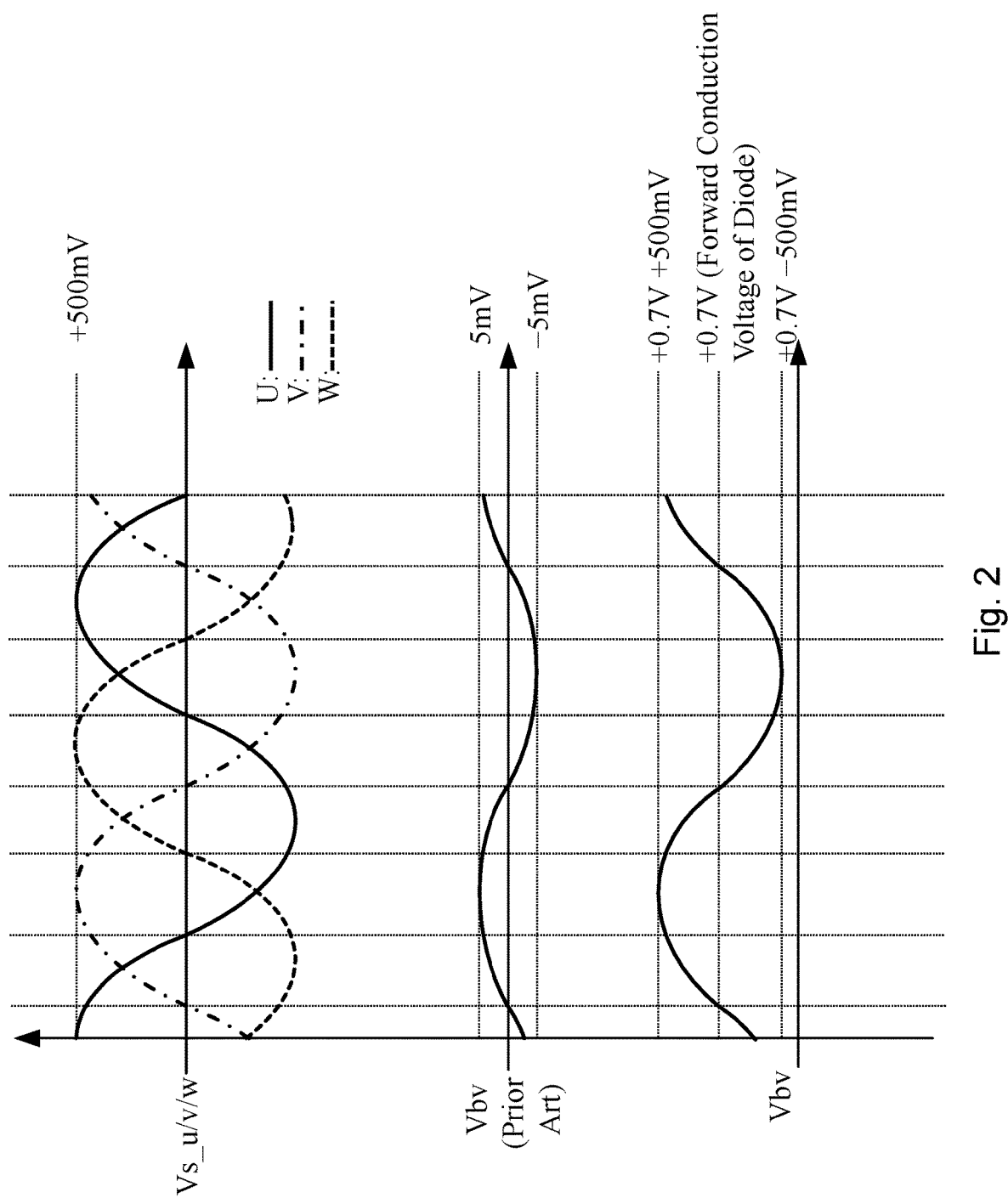
FIG. 2 shows a signal waveform diagram indicative of a small BEMF detected by the BLDC motor driver circuit of the present invention and a signal waveform diagram indicative of a small BEMF detected by conventional BLDC motor driver circuit.

Please refer to FIG. 2, which shows a signal waveform diagram indicative of a small BEMF detected by the BLDC motor driver circuit of the present invention and a signal waveform diagram indicative of a small BEMF detected by conventional BLDC motor driver circuit. The voltages (i.e., the voltage Vsw, the voltage Vsv and the voltage Vsu) at the reverse end 1031 of the unidirectional control devices, a detection signal Vbv detected by prior art and a detection signal Vbv detected by the BLDC motor driver circuit of the present invention are shown in FIG. 2. As shown in FIG. 2, by the same start-up test signal, the amplitude of the BEMF detected by prior art is 5 mV (one side), whereas, the amplitude of the BEMF detected by the BLDC motor driver circuit of the present invention is 500 mV (one side), which is about the same as its original level. As a result, as compared to prior art, the present invention can greatly improve the resolution of the signal, and the controller can easily read the BEMF correctly. The BEMF detected by the BLDC motor driver circuit of the present invention can be biased to a positive level (for example but not limited to +0.7V), for the controller to read. It is also workable if the BEMF detected by the BLDC motor driver circuit of the present invention is not biased to a positive level, but since a negative BEMF may occur, a negative voltage controller will be required, which is complicated.

Figure 3:
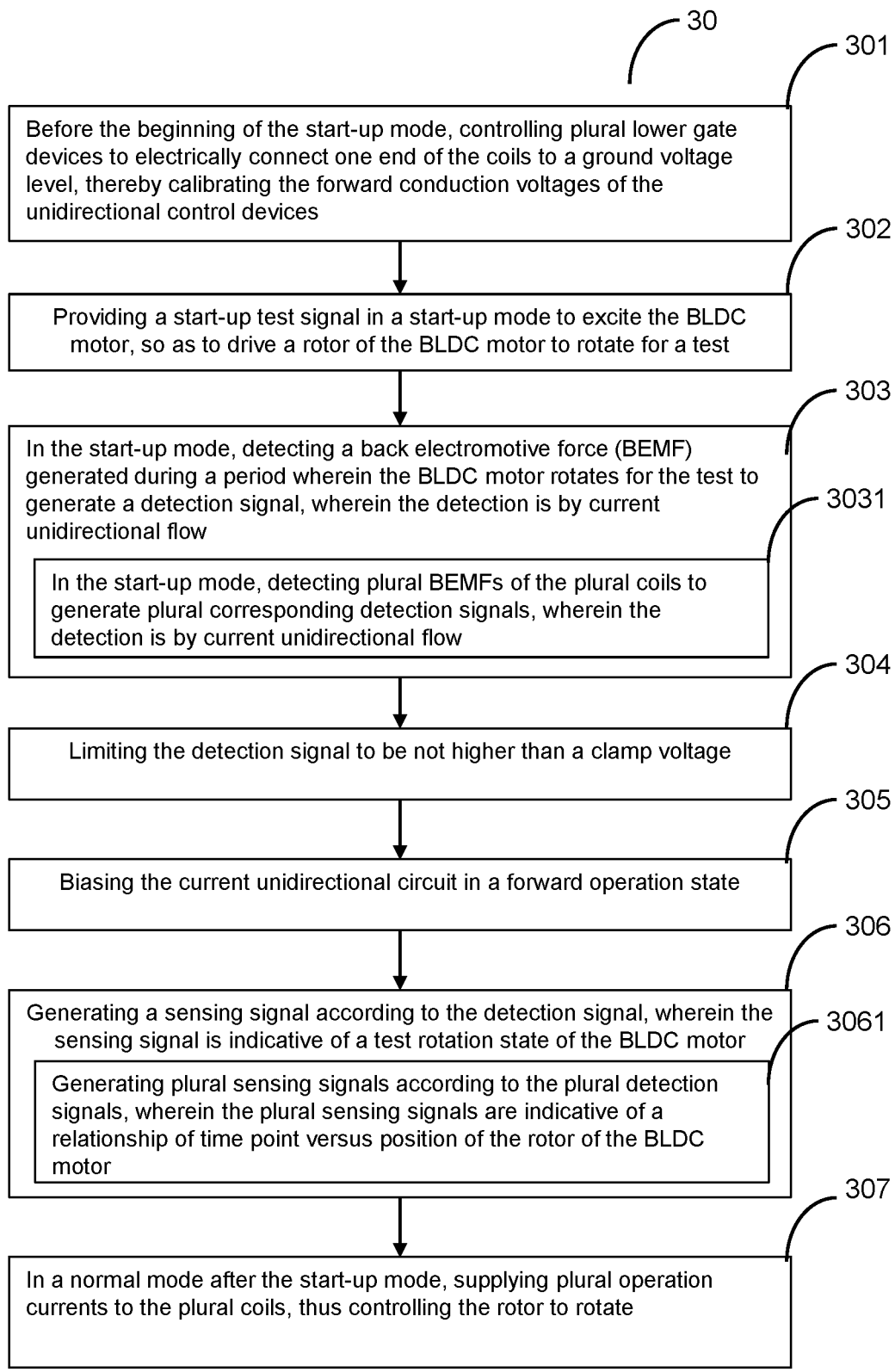
FIG. 3 shows a flowchart diagram illustrating a start-up control method for controlling a brushless DC electric (BLDC) motor driver circuit.

Please refer to FIG. 3, which shows a flowchart diagram illustrating a start-up control method for controlling a brushless DC electric (BLDC) motor driver circuit. As shown in FIG. 3, the start-up control method for controlling a brushless DC electric (BLDC) motor driver circuit according to the present invention comprises the following steps: Step 301: Before the beginning of the start-up mode, controlling plural lower gate devices to electrically connect one end of plural coils to a ground voltage level, thereby calibrating the forward conduction voltages of plural unidirectional control devices. Next, proceeding to step 302: providing a start-up test signal in a start-up mode to excite the BLDC motor, so as to drive a rotor of the BLDC motor to rotate for a test. Next, proceeding to step 303: in the start-up mode, detecting a BEMF generated during a period wherein the BLDC motor rotates for the test, to generate a detection signal, wherein the detection is by current unidirectional flow. In one embodiment, the step 303 comprises step 3031: in the start-up mode, detecting plural BEMFs of the plural coils to generate plural corresponding detection signals, wherein the detection is by current unidirectional flow. Next, proceeding to step 304: limiting the detection signal to be not higher than a clamp voltage. Next, proceeding to step 305: biasing the current unidirectional circuit in a forward operation state. Next, proceeding to step 306: generating a sensing signal according to the detection signal, wherein the sensing signal is indicative of a test rotation state of the BLDC motor. In one embodiment, the step 306 comprises step 3061: generating plural sensing signals according to plural detection signals, wherein the plurality of sensing signals are indicative of a relationship of time point versus position of the rotor of the BLDC motor. Next, proceeding to step 307: in a normal mode after the start-up mode, supplying plural operation currents to the plural coils, thus controlling the rotor to rotate.

As described above, advantages of the present invention include: that the present invention can retrieve a back electromotive force (BEMF) by a predetermined ratio via a current unidirectional circuit, and bias it at a positive level, so that a controller can read it correctly; that the present invention can resist a high voltage, to protect the controller from being damaged; that the present invention can clamp a high voltage via a biasing circuit, so as to prevent the controller from being damaged; that the present invention can detect a very small BEMF, so that only a small disturbance of the rotor of the BLDC motor is required.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A brushless DC electric (BLDC) motor driver circuit, which is configured to operably drive a BLDC motor; the BLDC motor driver circuit comprising:
   a driving power stage circuit, which is configured to operably provide a start-up test signal in a start-up mode to excite the BLDC motor, so as to drive a rotor of the BLDC motor to rotate for a test;
   a current unidirectional circuit having a reverse end coupled to the BLDC motor, wherein the current unidirectional circuit is configured to operably detect a back electromotive force (BEMF) generated during a period wherein the BLDC motor rotates for the test in the start-up mode, so as to generate at least one detection signal at a forward end of the current unidirectional circuit, and wherein when a voltage at the reverse end is higher than a voltage at the forward end, the current unidirectional circuit is configured to operably limit the voltage at the forward end not to be higher than a clamp voltage;

a biasing circuit coupled to the forward end of the current unidirectional circuit, wherein the biasing circuit is configured to operably bias the current unidirectional circuit in a forward operation state and is configured to operably provide the clamp voltage; and a sensor circuit coupled to the forward end, wherein the sensor circuit is configured to operably generate at least one sensing signal according to the detection signal, wherein the sensing signal is indicative of a test rotation state of the BLDC motor.

2. The BLDC motor driver circuit of claim 1, wherein the BLDC motor includes a plurality of coils, and wherein in a normal mode subsequent to an end of the start-up mode, the driving power stage circuit is configured to operably supply a plurality of operation currents to the plurality of coils according to the sensing signal, thus controlling the rotor to rotate.

3. The BLDC motor driver circuit of claim 2, wherein the sensor circuit is configured to operably generate a plurality of sensing signals according to a plurality of detection signals, and wherein the current unidirectional circuit includes a plurality of unidirectional control devices, wherein in the start-up mode, each unidirectional control device is configured to operably sense a corresponding BEMF, so as to generate a corresponding one of the detection signals; wherein the plurality of sensing signals indicate a relationship of time point versus position of the rotor of the BLDC motor.

4. The BLDC motor driver circuit of claim 1, wherein the current unidirectional circuit includes at least one unidirectional control device, wherein the at least one unidirectional control device includes one of the following:

(1) a diode having a forward end coupled to the forward end of the current unidirectional circuit and having a reverse end coupled to the reverse end of the current unidirectional circuit;

(2) a first Metal-Oxide-Semiconductor Field-Effect Transistor (MOSFET) device, which is configured as a MOSFET diode in a diode-connected manner, the MOSFET diode having a forward end coupled to the forward end of the current unidirectional circuit and having a reverse end coupled to the reverse end of the current unidirectional circuit; or (3) a second MOSFET device having a first end coupled to the forward end of the current unidirectional circuit and having a second end coupled to the reverse end of the current unidirectional circuit, wherein when the voltage at the reverse end of the current unidirectional circuit is higher the voltage at the forward end of the current unidirectional circuit, the second MOSFET device is OFF, and wherein when the voltage at the reverse end of the current unidirectional circuit is not higher than the voltage at the forward end of the current unidirectional circuit, the second MOSFET device is ON.

5. The BLDC motor driver circuit of claim 3, wherein the driving power stage circuit includes: a plurality of groups of half-bridge power devices, which are configured to operably generate the plurality of operation currents.

6. The BLDC motor driver circuit of claim 5, wherein before the start-up mode begins, the sensor circuit is configured to operably control a plurality of lower gate devices in the plurality of groups of half-bridge power devices, so as to electrically connect one end of the plurality of coils to a ground voltage level, thereby calibrating forward conduction voltages of the plurality of unidirectional control devices.

7. A start-up control method for controlling a brushless DC electric (BLDC) motor driver circuit, wherein the BLDC motor driver circuit is configured to operably drive a BLDC motor; the start-up control method comprising:

providing a start-up test signal in a start-up mode to excite the BLDC motor, so as to drive a rotor of the BLDC motor to rotate for a test;

in the start-up mode, detecting aback electromotive force (BEMF) generated during a period wherein the BLDC motor rotates for the test, so as to generate a detection signal wherein the step of detecting the BEMF is by current unidirectional flow;

limiting the detection signal not to be higher than a clamp voltage; and generating a sensing signal according to the detection signal, wherein the sensing signal is indicative of a test rotation state of the BLDC motor.

8. The start-up control method of claim 7, wherein the BLDC motor includes a plurality of coils, and wherein in a normal mode subsequent to an end of the start-up mode, a driving power stage circuit is configured to operably supply a plurality of operation currents to the plurality of coils, thus controlling the rotor to rotate.

9. The start-up control method of claim 8, further comprising:

in the start-up mode, detecting a plurality of BEMFs of the plurality of coils, so as to generate a plurality of detection signals, wherein the step of detecting the plurality of BEMFs is by current unidirectional flow; and generating a plurality of sensing signals according to the plurality of detection signals, wherein the plurality of sensing signals indicate a relationship of time point versus position of the rotor of the BLDC motor.

* * * * *